United States Patent
McGuire et al.

(10) Patent No.: US 8,892,034 B2
(45) Date of Patent: Nov. 18, 2014

(54) MODULAR TERMINAL ASSEMBLY FOR WIRELESS TRANSMITTERS

(75) Inventors: Chad Michael McGuire, Shakopee, MN (US); Brett Robert Morrison, Minnetrista, MN (US)

(73) Assignee: Rosemount Inc., Chanhassen, MN (US)

( * ) Notice: Subject to any disclaimer, the term of this patent is extended or adjusted under 35 U.S.C. 154(b) by 221 days.

(21) Appl. No.: 13/532,947

(22) Filed: Jun. 26, 2012

(65) Prior Publication Data
US 2013/0344818 A1 Dec. 26, 2013

(51) Int. Cl.
*H04B 5/00* (2006.01)

(52) U.S. Cl.
USPC ............ 455/41.1; 455/73; 455/90.3; 361/728

(58) Field of Classification Search
USPC .......... 455/41.1, 41.2, 73, 90.3, 115.1, 127.1, 455/128, 572; 361/728
See application file for complete search history.

(56) References Cited

U.S. PATENT DOCUMENTS

| | | |
|---|---|---|
| 3,586,870 A | 6/1971 | Cwiak |
| 5,779,504 A | 7/1998 | Dominiak et al. |
| 5,797,759 A | 8/1998 | Mattis et al. |
| 6,457,367 B1 | 10/2002 | Behm et al. |
| 6,568,279 B2 | 5/2003 | Behm et al. |
| 7,490,516 B2 | 2/2009 | Hedtke et al. |
| 7,519,012 B2 | 4/2009 | Tapperson et al. |
| 7,901,238 B1 | 3/2011 | Muir et al. |
| 8,264,373 B2 * | 9/2012 | Hagg ........................ 340/870.07 |
| 8,346,191 B2 * | 1/2013 | Robinson et al. .......... 455/115.1 |
| 8,508,137 B2 * | 8/2013 | Reed ............................ 315/152 |
| 2007/0210745 A1 | 9/2007 | Dingeldein |
| 2007/0285224 A1 | 12/2007 | Karschnia et al. |
| 2009/0174570 A1 | 7/2009 | Hagg |
| 2009/0311976 A1 | 12/2009 | Vanderaa et al. |
| 2011/0171497 A1 | 7/2011 | McGuire |
| 2012/0157018 A1 | 6/2012 | Robinson et al. |

OTHER PUBLICATIONS

International Search Report and Written Opinion, dated Nov. 21, 2013, for PCT Application No. PCT/US2013/046305, 14 pages.

* cited by examiner

*Primary Examiner* — Tuan H Nguyen
(74) *Attorney, Agent, or Firm* — Kinney & Lange, P.A.

(57) ABSTRACT

A terminal module is configured to fit inside an internal power source receptacle in a housing of a process field device, and comprises a wired power source connection, power conditioning electronics, and a field device connection. The wired power source connection is configured to receive power from an external source. The power conditioning electronics are capable of conditioning power from the wired power source connection for reception by the industrial field device. The field device connection is configured to provide power conditioned by the power conditioning electronics to the process field device via a terminal configured to receive and mate with the internal power source.

25 Claims, 10 Drawing Sheets

MODULAR TERMINAL ASSEMBLY FOR WIRELESS TRANSMITTERS

BACKGROUND

The present invention relates generally to industrial process field devices, and more particularly to a modular terminal assembly for wireless process variable transmitters.

The term "field device" covers a broad range of process control and monitoring devices that measure and control parameters such as pressure, temperature, and flow rate. Many field devices include transceivers which act as communication relays between an industrial process variable sensor and a remote control or monitoring device such as a computer. The output signal of a sensor, for example, is generally insufficient to communicate effectively with a remote control or monitoring device. A field device bridges this gap by receiving communication from the sensor, converting this signal to a form more effective for longer distance communication (for example a modulated 4-20 mA current loop signal, or a wireless protocol signal), and transmitting the converted signal to the remote control or monitoring device.

Field devices are used to monitor and control a variety of parameters of industrial processes, including pressure, temperature, viscosity, and flow rate. Other field devices actuate valves, pumps, and other hardware of industrial processes. Each field device typically comprises a sealed enclosure containing actuators and/or sensors, electronics for receiving and processing sensor and control signals, and electronics for transmitting processed sensor signals so that each field device and industrial process parameter may be monitored remotely. Large scale industrial manufacturing facilities typically employ many field devices distributed across a wide area. These field devices usually communicate with a common control or monitoring device, allowing industrial processes to be centrally monitored and controlled.

Field devices increasingly use wireless transceivers to communicate with centralized control and monitoring systems. Wireless devices extend the reach of control or process monitoring systems beyond that of wired devices to locations where wiring may be difficult, unsafe, or expensive to provide. In some cases, wireless field devices may be powered by direct electrical connection to power utilities such as 120V AC utilities. More often, however, power utilities are not located nearby or cannot readily be installed in hazardous locations where instrumentation and transducers must operate. Accordingly, field devices are often locally powered by power sources with limited capacity, either stored, as in the case of a long-life battery, or produced, as in the case of an energy harvester. Batteries, for instance, are typically expected to last more than five years, and preferably as long as the life of the field device. Because local power sources have limited capacities, the use of lower power electronics and RF radios is frequently essential for many wireless field devices.

Many field device designs enclose an attached battery under a cover of the sealed enclosure of the field device. Other field devices utilize power from external sources (e.g. nearby utility grids or energy harvesters such as solar panels, vibrational scavengers, or thermoelectric scavengers). Each method of powering a wireless field device conventionally requires a different wiring terminal interface. Field devices which run partly or entirely on battery power typically incorporate small terminal blocks which provide connection points to an attached battery. These small terminal blocks are housed in narrow spaces between the sealed interior of the field device and the attachment point of the battery. Wireless field devices which run on grid power, by contrast, include terminal blocks which provide wired connections for grid power (typically via screw terminals), and which condition grid power for use by the field device. Solar panels, vibrational energy scavenging systems, and other types of local power modules may all use different terminal blocks. In addition, different field device models may require different terminal block parts which are not necessarily intercompatible. A first field device model might, for instance, require a first terminal block part to receive battery power, a second to receive grid power, and a third to receive solar power. A second field device model might utilize fourth, fifth, and sixth terminal block parts to make the same battery, grid, and solar power connections. Complex industrial processes monitored or actuated via a large number of diverse models of field devices running on a variety of power sources can utilize many different kinds of terminal blocks, making it impractical or inconvenient to store replacements for each.

SUMMARY

The present invention is directed toward a terminal module configured to fit inside a battery receptacle of a process field device. The terminal module comprises a wired power source connection, power conditioning electronics, and a field device connection. The wired power source connection is configured to receive power from an external source. The power conditioning electronics are capable of conditioning power from the wired power source connection for reception by the process field device. The field device connection is configured to provide power conditioned by the power conditioning electronics to the process field device via a terminal block configured to receive and mate with a battery.

DETAILED DESCRIPTION

The present invention is a modular terminal assembly for a wireless process transmitter or actuator. This terminal block assembly includes a terminal block and a terminal module, both of which are configured to fit inside a sealed enclosure of the wireless transmitter. The terminal block is selected to match the particular design of the wireless transmitter, while the terminal module is selected to match a desired power source. The terminal block and terminal module together act to receive and condition power from this power source for use by the field device.

Figure 1:
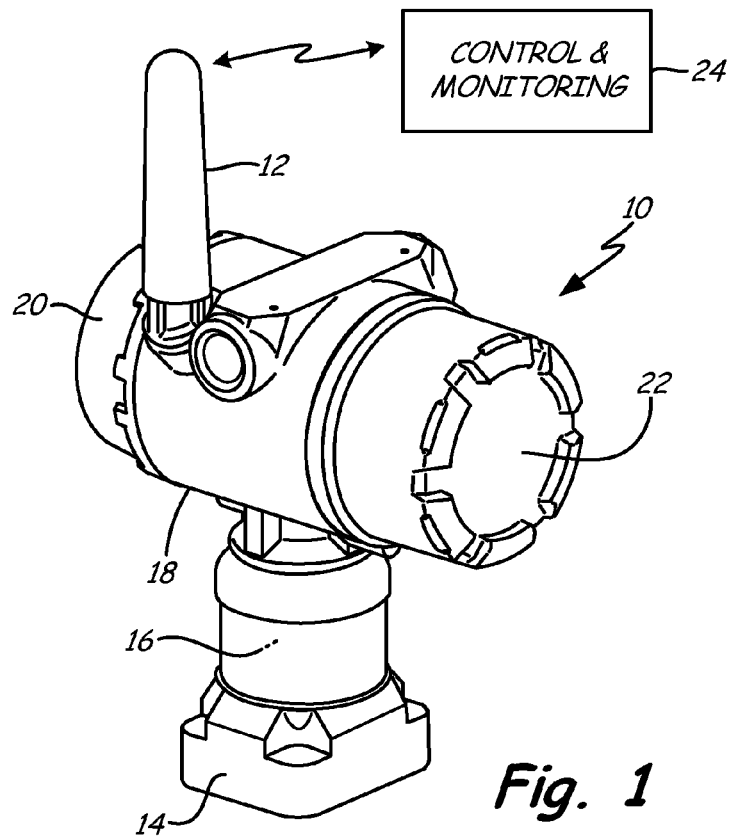
FIG. 1 is a perspective view of a process monitoring field device in a wireless system.

FIG. 1 depicts field device 10 with antenna 12, process connection 14, transducer 16, central housing 18, electronics cover 20, and battery cover 22. Field device 10 is a sensor/transceiver device configured to monitor an industrial process and transmit sensor readings to a central control or monitoring system 24 via antenna 12. Control or monitoring system 24 may, for instance, be a computer located at an on-site facility control room, or an off-site data archiving system. Field device 10 may communicate with central control or monitoring system 24 directly, or via a wireless network of other field devices such as a mesh or hub-and-spoke network. In some embodiments, field device 10 may communicate with central control and/or monitoring system via the wirelessHART protocol (IEC 62591). In alternative embodiments, other wireless communication protocols may be utilized with this invention.

Process connection 14 provides a fluid connection to process apparatus such as valves, pumps, or piping carrying process fluid flow. Process connection 14 may be an in-line connection or a parallel connection to a process flow, depending on the particular process application and the parameter to be measured by field device 10. Process connection 14 houses transducer 16, which is a process transducer such as a pressure, flow rate, or viscosity sensor, which monitors a parameter of process fluid flow at process connection 14. As depicted in FIG. 1, transducer 16 is an integral part of field device 10, and process connection 14 serves to anchor and support field device 10. In alternative embodiments, transducer 16 and process connection 14 may be situated externally to field device 10, and connected to field device 10 by appropriate wiring or other connection. Some embodiments of field device 10 may include more than one transducer 16.

Wireless device 10 includes sensing and signal processing electronics located in central housing 18, which may for instance be a molded plastic resin enclosure. Central housing 18 protects internal electronics from hazardous environments. Central housing 18 may, in some embodiments, be a two-compartment enclosure with two separately sealed compartments: an electronics compartment containing processing and signal conditioning hardware and capped by electronics cover 20, and a power compartment containing a power source and capped by battery cover 22. Alternatively, central housing 18 may be single-compartment enclosure with a single internal space which houses both power sources and electronics. Electronics cover 20 and battery cover 22 may also be molded plastic resin pieces, and are configured to form seals with central housing 18 to protect enclosed components from dust, debris, and harmful or dangerous environmental conditions.

Field device 10 contains electronics which process and transmit signals to and from transducer 16, as discussed in greater detail below. Both signal processing and signal transmission require energy, which is supplied either by an internal power source situated within central housing 18 (see FIGS. 2-4), or by an external power source situated outside central housing 18 (see FIGS. 5-7). Possible internal power sources include batteries and capacitors, while possible external power sources include solar cells, utility power grids, and energy harvesters such as vibrational or thermoelectric scavengers.

Figure 2:
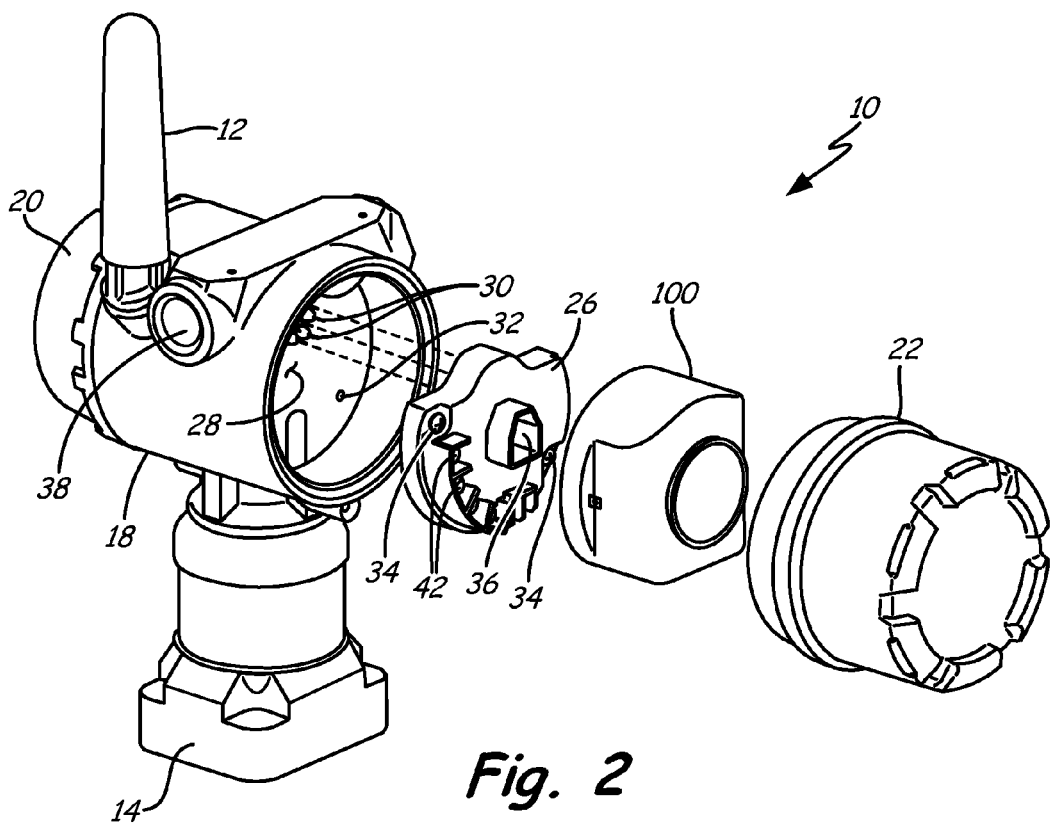
FIG. 2 is an exploded perspective view of the field device of FIG. 1, configured to operate on internal power.

FIG. 2 is an exploded perspective view of field device 10 as configured to draw power from internal power source 100. FIG. 2 depicts antenna 12, process connection 14, transducer 16, central housing 18, electronics cover 20, battery cover 22, terminal block 26, internal wall 28, power connectors 30, screw holes 32, terminal block attachment screws 34, power source connection 36, conduit 38, field wiring connections 42, and internal power source 100. FIG. 2 is exploded to show the contents of a power compartment defined by central housing 18 and battery cover 22. A separate sealed electronics compartment is defined by central housing 18 and electronics cover 20, as described above, and contains signal processing, transmission, and reception electronics as described in further detail below with respect to FIG. 3. Internal wall 28 is an impermeable barrier that separates the electronics compartment from the power compartment.

Terminal block 26 and internal power source 100 are situated inside the power compartment defined by central housing 18 and battery cover 22. Terminal block 26 is a feedthrough connector which routes power from internal power source 100 (or from other sources, as described below with respect to FIGS. 5-7) to electronics situated in the separate sealed electronics compartment noted above. Internal power source 100 is a battery, capacitor, or analogous power storage device. Internal power source 100 provides power to run electronics for signal processing, transmission, and reception. In an assembled state, battery cover 22 fits snugly over internal power source 100, clamping internal power source to terminal block 26, and terminal block 26 to internal wall 28. This clamping may be mediated by a plate or wave spring inside battery cover 22 (see FIG. 6), and prevents terminal block 26, internal wall 28, and internal power source 100 from separating due to vibration of field device 10. The connection between terminal block 26 and internal power source 100 is described in further detail below with respect to FIG. 3.

In addition to providing an input interface for power from internal power source 100, terminal block 26 may include field wiring connections 42 as interfaces for receiving voltage signals from transducers and other field apparatus not included within field device 10. Field wiring connections 42 are described in greater detail below with respect to FIG. 3, and may for instance comprise clamp or screw connections for conductive wiring which enters the power compartment defined by main housing 18 and battery cover 22 through conduit 38. Conduit 38 is a sealed passage that allows cables to enter the power compartment through main housing 18.

According to this embodiment, terminal block 26 provides a direct feedthrough connection between internal power source 100 and field device electronics through power connectors 30 and power source connection 36. In the depicted embodiment, power connectors 30 are conductive pins protruding from internal wall 28, and configured to deliver power from terminal block 26 to electronics within the electronics compartment. Power connectors 30 are received in complementing recesses on a back side of terminal block 26 (not shown), as described in further detail with respect to FIG. 6. Power source connection 36 is a recess or sleeve with electrical contacts configured to receive power from internal power source 100, as described in greater detail with respect to FIG. 3. Terminal block 26 is retained in connection with power connectors 30 by terminal block attachment screws 34, which pass through terminal block 26 and fasten into screw holes 32. Terminal block 26 does not provide any power conditioning, and serves only to allow an electrical connection between internal power source 100 and power connectors 30. Different models of field device 10 may utilize different configurations or forms of power connectors 30, necessitating different terminal blocks 26. Internal power source 100 can accordingly be used in a variety of different embodiments of field device 10 by utilizing an appropriate terminal block 26.

Figure 3:
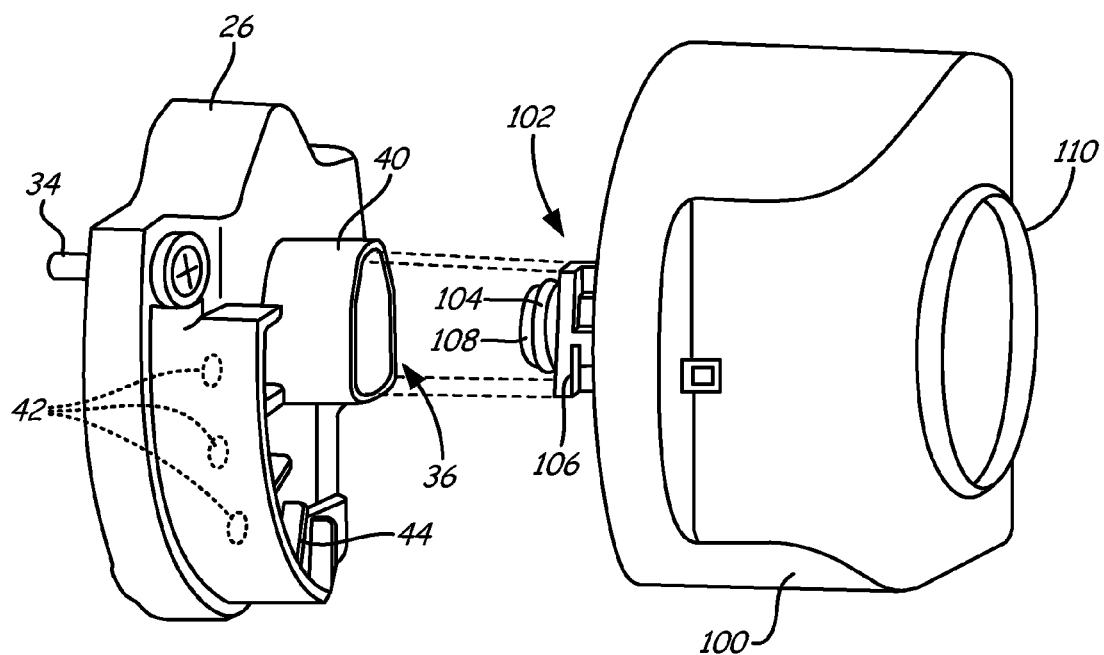
FIG. 3 is a close-up exploded view of a terminal block and internal power source of the field device of FIG. 2.

FIG. 3 is an exploded perspective view of one illustrated embodiment of terminal block 26 and internal power source 100. FIG. 3 depicts power source connection 36 (with rigid sleeve 40), field wiring connections 42, barrier walls 44, connector insert 102 (with O-ring 104, asymmetric body 106, and electrical connection 108), and retaining ring 110. As described above, terminal block 26 attaches to internal wall 28 via terminal module attachment screws 34. Internal power source 100 includes at least one capacitor, battery or analogous energy storage device.

As explained above pursuant to this embodiment, terminal block 26 is a feedthrough component which directs power from internal power source 100, through power source connection 36, to power connectors 30 (see FIG. 2). Internal power source 100 includes connector insert 102, a protruding portion with asymmetric body 106 that mates with rigid sleeve 40 of power source connection 36. Rigid sleeve 40 is a rotationally asymmetric socket that matches asymmetric body 106, thereby preventing internal power source 100 from rotating relative to terminal block 26 when terminal block 26 and internal power source 100 are connected. Connector insert 102 further includes O-ring 104, which forms a friction fit with an interior portion of rigid sleeve 40, and electrical connection 108, which forms an electrical contact with a conducting plate or pin (not shown) within rigid sleeve 40.

In the depicted embodiment, terminal block 26 further includes several field wiring connections 42 separated by barrier walls 44. Field wiring connections 42 may, for instance, be clamp or screw attachments for wires or cables extending through conduit 38 (see FIG. 2) to externally located field apparatus such as transducers analogous to transducer 16. Such field wiring carries signals indicative of sensed industrial parameter values. Barrier walls 44 separate wiring connections 42, preventing field wiring on terminal block 26 from crossing. Signals from field wiring connections 42 are transmitted to signal processing and transmission electronics via appropriate power connectors 30, as described in greater detail with respect to FIG. 4. Not all embodiments of terminal block 26 need include field wiring connections 42. In its most elementary embodiment, terminal block 26 serves only to relay power from internal power source 100 or external power sources connected as described below with respect to FIGS. 5-7.

In addition to the friction fit provided by O-ring 104, some embodiments of internal power source 100 and terminal block 26 may include tabs, bayonets, or other fastening means for securing internal power source 100 to terminal block 26. As depicted in FIG. 3, internal power source 100 includes retaining ring 110, a ring-shaped ridge which interfaces with battery cover 22 to further retain internal power source 110 in contact with terminal block 26 when battery cover 22 is closed.

Internal power source 100 can be replaced with terminal module 300 to allow field device 10 to run on external power, as described below with respect to FIGS. 5-7. Terminal module 300 is configured to mate with the same terminal block 26 used by internal power source 100, thereby reducing the number of separate components potentially needed across all possible power source configurations.

Figure 4:
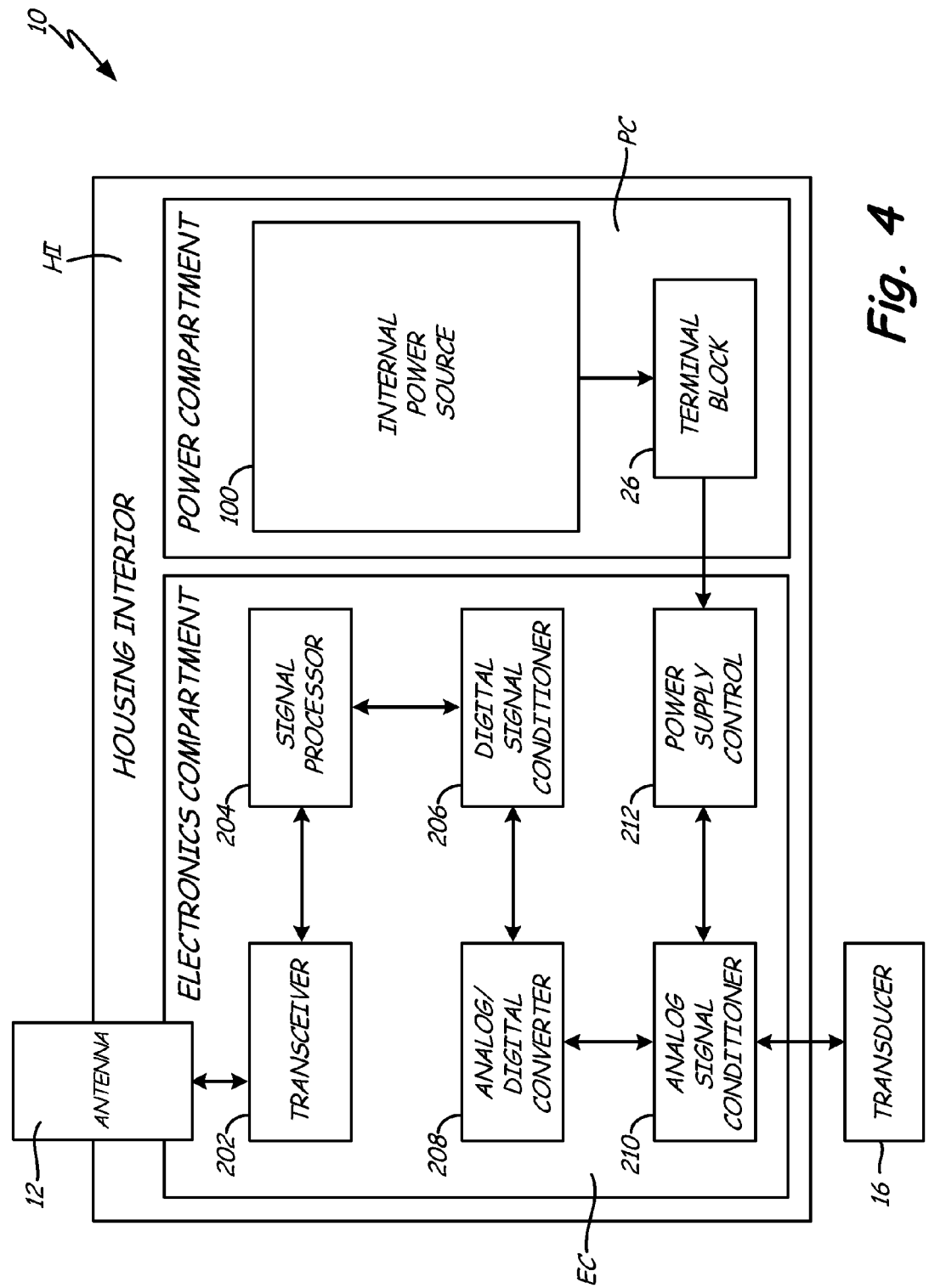
FIG. 4 is a schematic block diagram of the field device of FIGS. 2 and 3.

FIG. 4 is a schematic block diagram of one embodiment of field device 10 set up to run on internal power. FIG. 4 depicts housing interior HI, electronics compartment EC, power compartment PC, antenna 12, transducer transceiver 202, signal processor 204, digital signal conditioner 206, analog/digital converter 208, analog signal conditioner 210, power supply control 212, terminal block 26, and internal power source 100.

Housing interior HI is an interior space defined by central housing 18, electronics cover 20, and battery cover 22 (see FIG. 2). As depicted in FIGS. 2 and 3, internal wall 28 subdivides housing interior HI into electronics compartment EC and power compartment PC. Electronics compartment EC and power compartment PC are separately sealed enclosures dedicated to signal processing and transmission (in the case of electronics compartment EC) and power supply (in the case of power compartment PC).

According to this embodiment, transceiver 202 is a signal transmitter/receiver which transmits and receives wireless signals via antenna 12. Signal processor 204 is a logic-capable data processor such as a microprocessor. Digital signal conditioner 206 is digital filter which operates on digitized sensor signals, and which may be configurable by signal processor 204 in response to diagnostic programs or instructions from central control or monitoring system 24. Digital signal conditioner 206 may, for instance, operate to filter noise or extract signals of interest from the raw digitized signal provided by analog/digital converter 208. Analog/digital converter 208 is an analog-to-digital converter capable of digitizing analog sensor signals from transducer 16. Analog signal conditioner 210 is an analog signal conditioner, which may for instance perform band-pass filtering to isolate one or more regions of interest from signals received from transducer 16. Power supply control 212 is a power routing device configured to draw power from terminal block 26 via power connector 30, and report the voltage received from terminal block 26 to signal processor 204 (for instance via analog signal conditioner 210) as a means for monitoring power quality and imminent power failure. Power supply control 212 receives electrical power from internal or external sources via terminal block 26, and supplies this power as needed to transceiver 202, signal processor 204, digital signal conditioner 206, analog/digital converter, analog signal conditioner 210, and any other powered components of field device 10. Transducer 16 may be an integral part of field device 10, as depicted in FIG. 1, or may be a separate external component connected to analog signal conditioner 210 by wire. Transducer 16 may also receive power from power supply control 212, or may be powered separately.

During operation, analog signal conditioner 210 receives and filters process signals from transducer 16 corresponding to sensed industrial process parameters. These filtered signals are then digitized by analog/digital converter 208, and further filtered by digital signal conditioner 206 prior to processing by signal processor 204. Some embodiments of field device 10 may dispense with one or both of digital signal conditioner 105 and analog signal conditioner 210, particularly if signals from transducer 16 are preconditioned. Similarly, analog/digital converter 208 is unnecessary in embodiments wherein transducer 16 provides a digital signal. Signal processor 204 assembles a process message based on the conditioned digital process signal, and transmits this process message via transceiver 202 and antenna 12. In addition to the sensed process variable, this process message may reflect sensor accuracy values, failure states of transducer 16, power or voltage states of power supply control 212, and device-side analysis of the sensed process variable. Although transceiver 202, signal processor 204, digital signal conditioner 206, analog/digital converter 208, and analog signal conditioner 210 have been described as distinct components, the functions of some or all of these components may in some embodiments be performed by shared hardware such as a common microprocessor. Field device 10 may also include a local operator interface (not shown) with, for instance, a screen and/or input keys allowing an operator to interact directly with field device 10.

Like other powered components of field device 10, such a local operator interface would draw power from power supply control 212.

All powered components of field device 10 receive power from power supply control 212. As depicted in FIG. 4, power supply control 212 receives power through terminal block 26 from internal power source 100. As explained below with respect to FIG. 5-7, field device 10 may alternatively be configured to receive power from an external source via terminal module 300. In either case, however, the same terminal block 26 is used to connect internal power source 100 as to connect terminal module 300. In this way, terminal block 26 is universal to any power source, internal or external, but may be specific to the model of field device 10. Terminal block 26 may, for instance, have a shape or configuration designed to fit into a particular model of field device 10.

Figure 5:
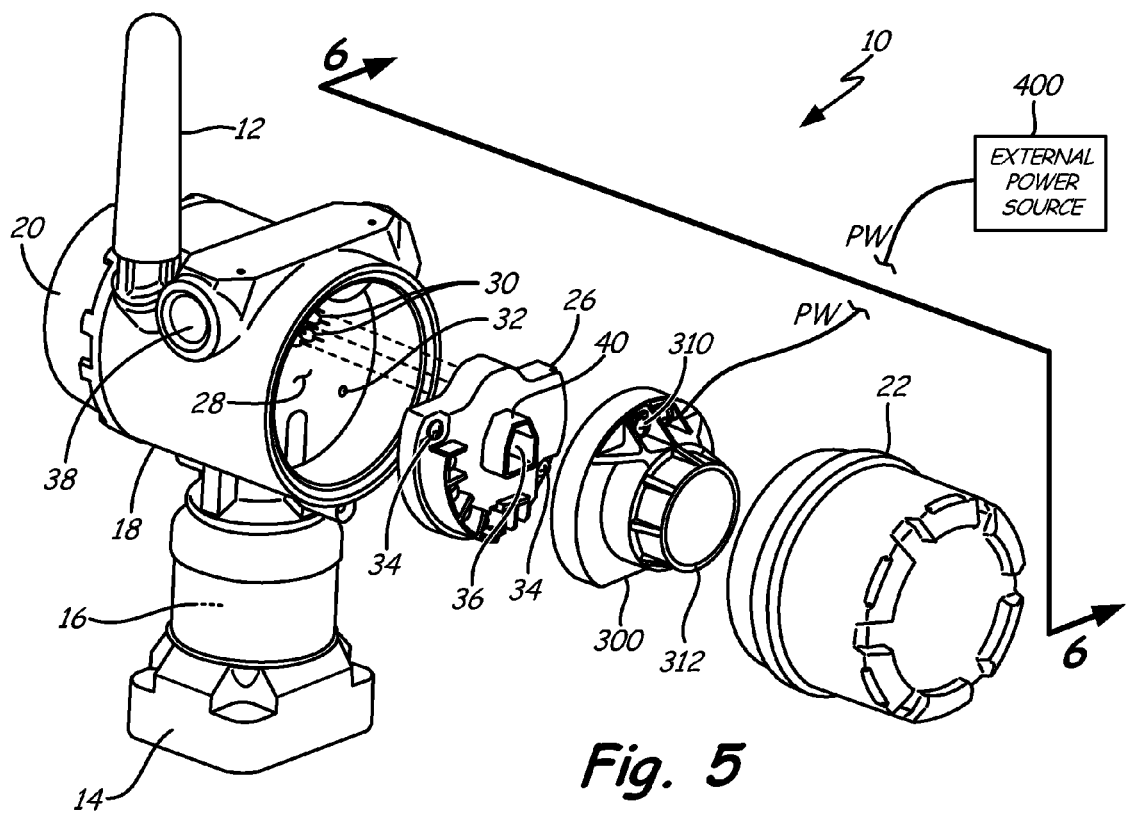
FIG. 5 is an exploded perspective view of the field device of FIG. 1, configured to operate on external power.

FIG. 5 is an exploded perspective view of one embodiment of field device 10 as configured to draw power from external power 400 source via terminal module 300. FIG. 2 depicts antenna 12, process connection 14, transducer 16, central housing 18, electronics cover 20, battery cover 22, terminal block 26, internal wall 28, power connectors 30, screw holes 32, terminal block attachment screws 34, power source connection 36, conduit 38, rigid sleeve 40, terminal module 300 (with screw terminals 310 and retaining ring 312), and external power source 400. External power source 400 is connected to terminal module 300 via power wiring PW. FIG. 5 is exploded to show the contents of power compartment PC, as explained above with respect to FIGS. 2-4.

With the exception of terminal module 300, which replaces internal power source 100, every component depicted in FIG. 5 matches FIG. 2. Antenna 12, process connection 14, transducer 16, central housing 18, electronics cover 20, battery cover 22, terminal block 26, internal wall 28, power connectors 30, screw holes 32, terminal block attachment screws, power source connection 36, conduit 38, and rigid sleeve 40 are all described above with respect to FIGS. 2 and 3. Terminal module 300 is a modular component designed to fit inside power compartment PC in the place of internal power source 100. Terminal module 300 receives and conditions power from external power source 400, which may be a utility power grid, a solar panel, an energy scavenging system such as a vibrational or thermoelectric scavenger, or any other external power source directly connected to terminal module 300.

Like internal power source 100, terminal module 300 attaches to terminal block 26 via power source attachment power source connection 36. Thus, the same attachment which supports and contacts internal power source 100 (described above with respect to FIG. 3) can identically accept terminal module 300, thereby receiving external power without further modification or configuration of field device 10. Like internal power source 100, terminal block 300 may additionally be supported against terminal block 26 by cover 116.

In this illustrative embodiment, terminal module 300 includes screw terminals 310 and retaining ring 312. Retaining ring 312 serves analogously to retaining ring 110 of internal power source 100, interfacing with a spring or flange of battery cover 22 to help clamp terminal module 300 to terminal block 26 when battery cover 22 is closed (see FIG. 6, below). Screw terminals 310 anchor and provide electrical connections for power wiring PW. Power wiring PW comprises wires or cables which extend from external power source 400 to terminal module 300. Power wiring PW may, for instance, pass between terminal module 300 and terminal block 26, and through conduit 38. Screw terminals 310 are depicted as threaded conductive screws which configured to secure exposed conductive wires of power wiring PW, but may be replaced with other electrical connection means such as plugs, clips, or clamps without departing from the spirit of the present invention.

Terminal module 300 includes power conditioning electronics suited to match voltages and currents expected at terminal block 26, as explained below with respect to FIG. 6. In cases wherein external power source 400 supplies AC power, terminal module 26 may be selected to include power conditioning electronics which rectify external power. Qualitatively, terminal module both provides an external interface to receive power from power source 400 (in the form of screw terminals 310), and appropriate internal power conditioning electronics to substantially match power quality received at screw terminals 310 to the output of internal power source 100. In this way, terminal module 300 allows external power source 22 to be connected to field device 10 without any change either in hardware or operation of power source control 212 or terminal block 26. Terminal module 300 is specific to power source 400. Each power source 400 may require different power conditioning and/or a different connection, which are provided by terminal module 300.

Figure 6:
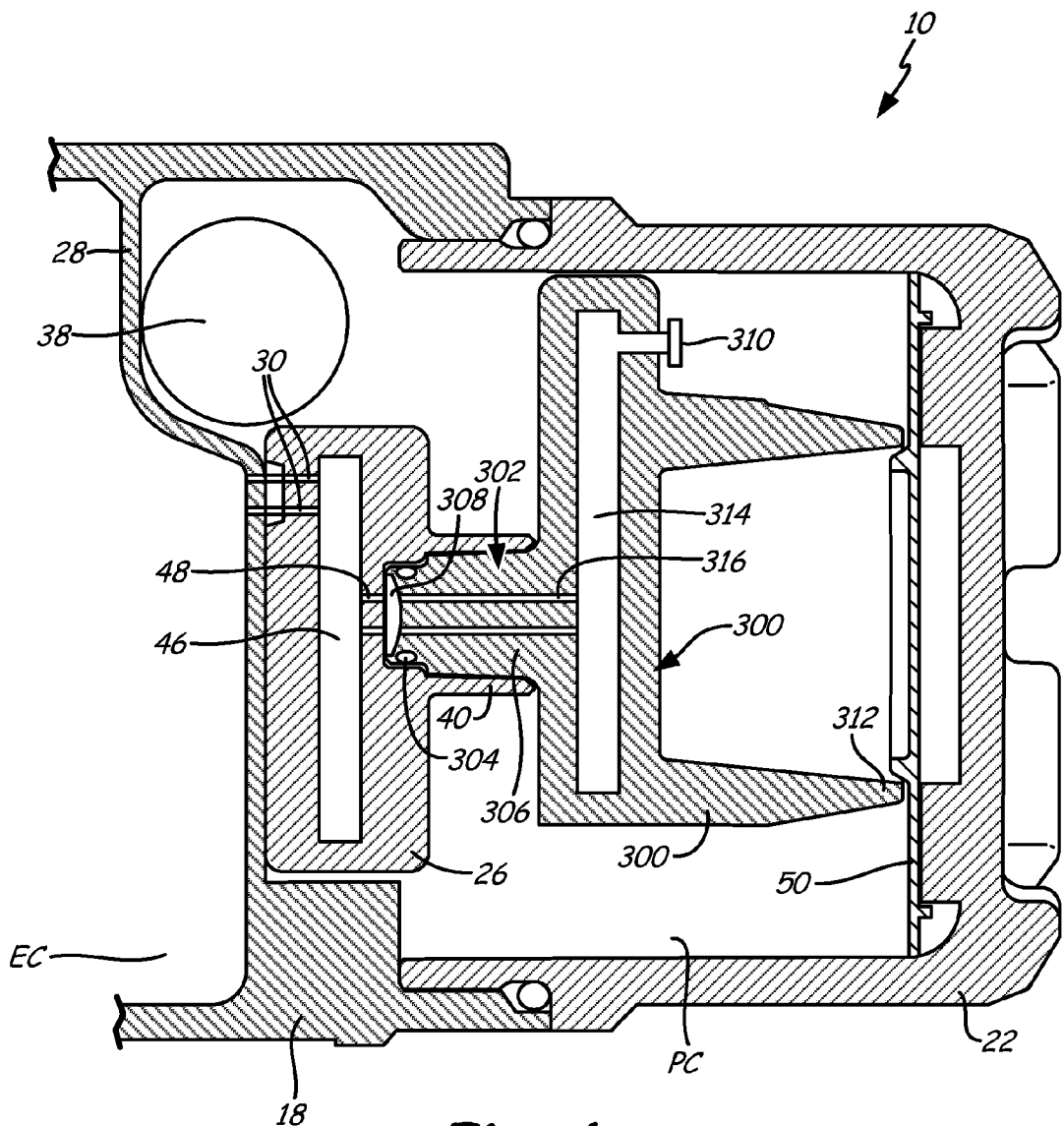
FIG. 6 is a cross-sectional view of a power supply section of the field device of FIG. 5.

Pursuant to this embodiment, FIG. 6 is a cross-sectional view of a region of field device 10 taken through section plane 6-6 (shown in FIG. 5). FIG. 6 depicts central housing 18, terminal block 26, battery cover 22, internal wall 28, power connectors 30, conduit 38, rigid sleeve 40, contact board 46, contact posts 48, wave spring 50, terminal module 300, electronics compartment EC, and power compartment PC. Terminal module 300 has screw terminal 310 and retaining ring 312 as described above, as well as connector insert 302, O-ring 304, asymmetric body 306, and electrical connection 308 analogous to connector insert 102, O-ring 104, asymmetric body 106, and electrical connection 108 of internal power source 100. Terminal module 300 further comprises circuit board 314 and terminal module posts 316.

Connector insert 302 of terminal module 300 is substantially identical to connector insert 102 of internal power source 100, so as to mate identically with terminal module 26. As described above with respect to FIGS. 2-4, terminal block 26 is a feed-through device which passes power rom connected devices such as internal power source 100 or terminal module 300 to power connectors 30. Terminal block 26 includes contact board 36, a circuit board or printed wiring board which receives power connectors 30 and connects each power connector 30 to appropriate power attached voltage sources such as internal power source 100 or terminal module 300, and field devices connected at field wiring connections 42 (see FIGS. 2 and 3). Terminal module 26 further comprises contact posts 48 which electrically contact terminal module 300 at electrical contacts 308, or internal power source 100 at electrical contacts 108, respectively.

Pursuant to this embodiment, asymmetric body 306 fits within rigid sleeve 40 identically to asymmetric body 106 of internal power source 100, and is analogously retained by a friction fit with O-ring 304. Wave spring 50 rests between battery cover 22 and terminal module 300, and helps to retain terminal module 300 in contact with terminal block 26 despite vibration which might otherwise cause terminal module 300 to detach from terminal module 26. Although wave spring 50 is not shown in FIG. 3 or 4, it may analogously be used to retain internal power source 100.

Screw terminals 310 of terminal module 300 attach to circuit board 314. Circuit board 314 carries power from power wiring connected at screw terminals 310 to electrical connection 308 via terminal module posts 316. Power wiring PW attaches at screw terminal 310, and may for instance extend beneath terminal module 300, between terminal module 300 and terminal block 26, and out through conduit 38 to external power source 400. Circuit board 314 further includes power conditioning electronics appropriate to match voltages at electrical connection 308 of terminal module 300 to voltages at electrical connection 108 of internal power source 100. Accordingly, circuit board 314 may include voltage regulation electronics such as current or overvoltage protection and/or a AC-DC rectifier, as appropriate to external power source 400. The particular voltage regulation circuitry included on circuit board 314 will depend on the nature of external power source 400 (e.g. circuit board 314 will include rectifiers only if external power source 400 supplies AC power). Thus, terminal module 300 is preferably specific to a particular external power source 400 or class of external power sources 400. A corresponding terminal module 300 may be selected to configure field device 10 for any desired external power source 400. In some embodiments, a single terminal module 300 may connect to and receive power from multiple distinct power sources 400.

Figure 7:
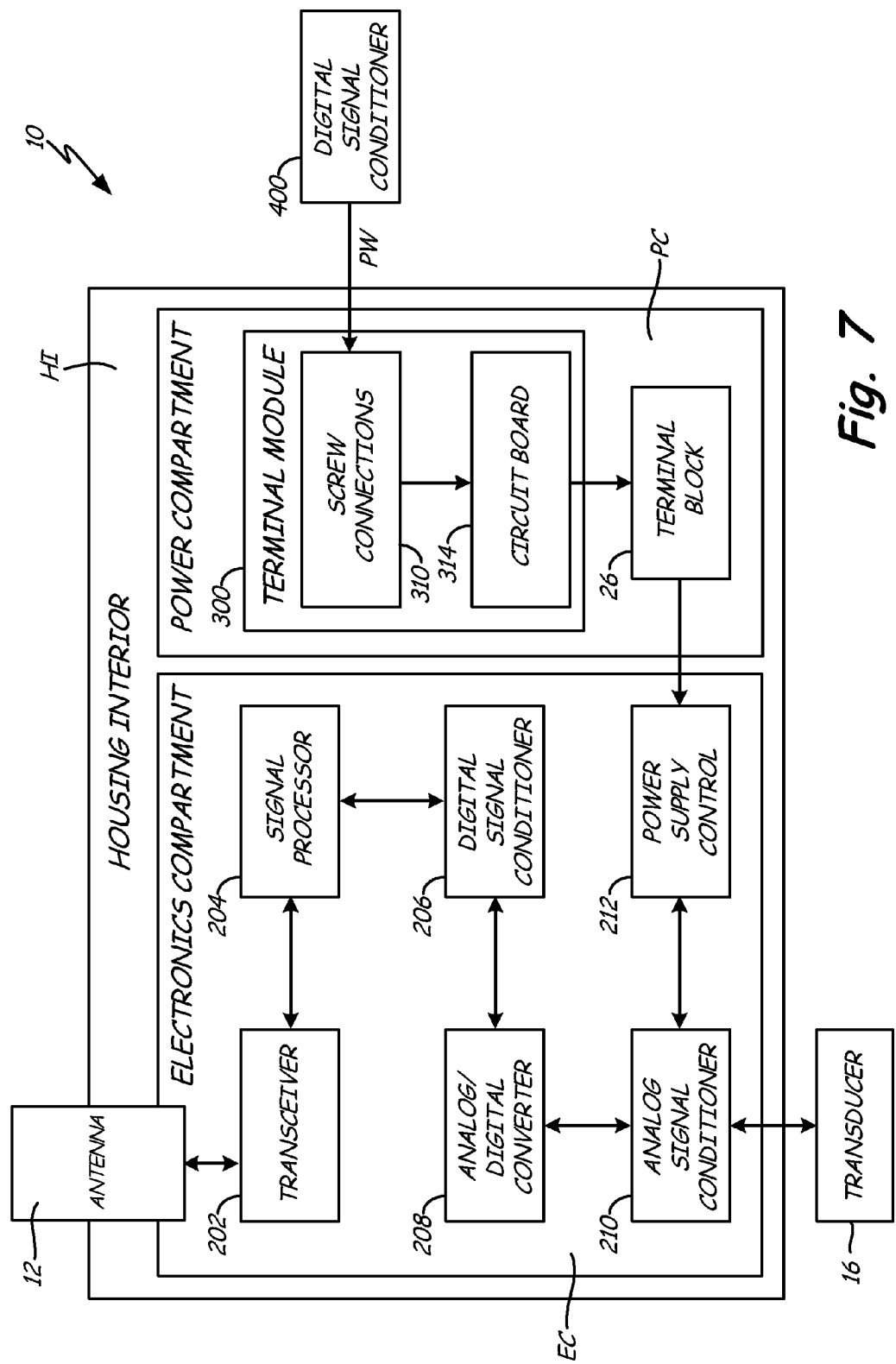
FIG. 7 is a schematic block diagram of the field device of FIGS. 5 and 6.

FIG. 7 is a schematic block diagram of field device 10 set up to run on external power. The configuration depicted in FIG. 7 is identical to the configuration depicted in FIG. 4, except that internal power supply 100 is replaced with terminal module 300. FIG. 7 depicts housing interior HI, electronics compartment EC, power compartment PC, antenna 12, transducer transceiver 202, signal processor 204, digital signal conditioner 206, analog/digital converter 208, analog signal conditioner 210, power supply control 212, terminal block 26, and terminal module 300 with screw terminals 310 and circuit board 314. As described above with respect to FIG. 6, screw connections anchor and provide a conductive interface to power wiring PW from external power source 400.

External power source 400 may, as described above, be selected from a wide range of external power sources including utility grids, solar panels, and energy harvesting systems such as vibrational or thermoelectric scavengers. Terminal module 300 is selected for each external power source 400 to condition power from external power source 400 for reception by terminal block 26, providing output voltages substantially similar to internal power source 100.

Terminal module 300 and terminal block 26 cooperate to reduce the number of distinct parts used in a system which powers multiple field device models using a variety of power sources. A conventional system utilizing a separate terminal block for each combination of field device model and power source will require up to N×M different terminal blocks, where N is the number of distinct field device models and M is the number of distinct power sources. By utilizing terminal module 300 in combination with terminal block 26, the present invention reduces this number to N+M. A system with four device models running on three distinct power sources, for instance, would conventionally use as many as twelve distinct terminal modules, while the present invention would require only seven distinct components: four permutations of terminal block 26, and three of terminal module 300.

Figure 8:
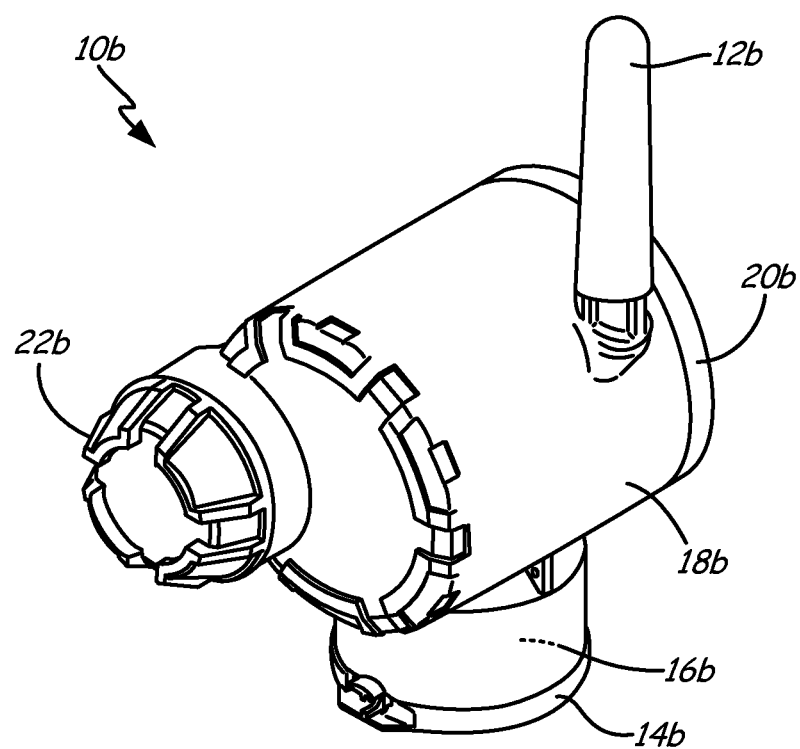
FIG. 8 is a perspective view of an alternative embodiment of the field device of FIG. 1.

FIG. 8 is a perspective view of field device 10b, an alternative embodiment of field device 10 (see FIG. 1). Field device 10b comprises antenna 12b, process connection 14b, transducer 16b, central housing 18b, electronics cover 20b, and battery cover 22b, all of which operate analogously to their respective counterparts (antenna 12, process connection 14, transducer 16, central housing 18, electronics cover 20, and battery cover 22) described above with respect to FIG. 1. Unlike field device 10, field device 10b does not include any analogue to conduits 38 which would allow cable ingress into a battery compartment through central housing 18. To outfit field device 10b to run on external power, battery cover 22b is therefore replaced with variant battery cover 22c with a cable conduit, as described below with respect to FIGS. 10 and 11.

Figure 9:
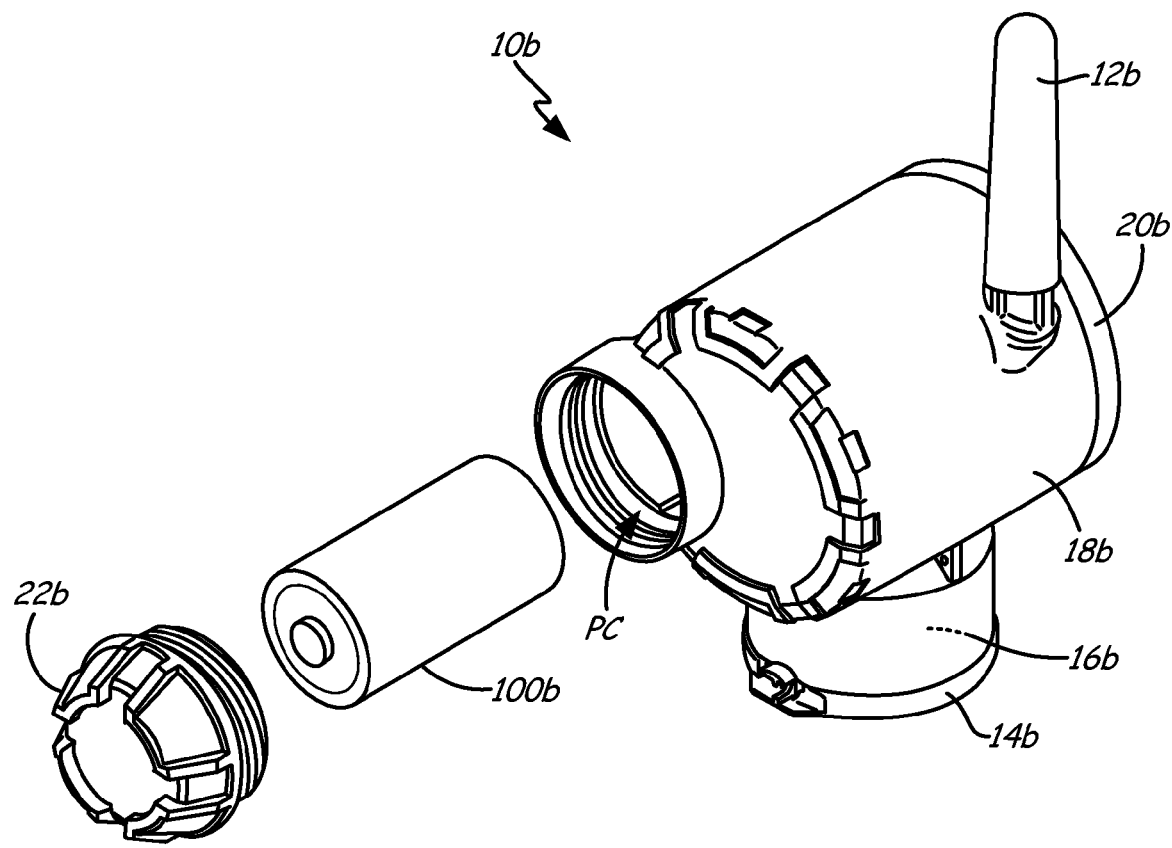
FIG. 9 is an exploded perspective view of the field device of FIG. 8, configured to operate on internal power.

FIG. 9 is an exploded perspective view of field device 10b as configured to run on internal power analogous to FIG. 2, above. FIG. 9 depicts antenna 12b, process connection 14b, transducer 16b, central housing 18b, electronics cover 20b, battery cover 22b, and internal power source 100b. Internal power source 100b may, for instance, be a convention C or D cell battery, rather than a component specially designed for field device 10b. Central housing 18b and battery cover 22b define power compartment PC, as shown. Power compartment PC is sized to receive internal power source 100b. Unlike field device 10, field device 10b does not utilize a separate terminal module 26 situated within power compartment PC. Internal power source 100b instead interfaces directly with an electrical contact in the rear of power compartment PC (not shown in FIG. 9; see FIG. 11). The limited lifespans of conventional C and D cell batteries may limit the use of field device 10b to relatively low power applications compared with field device 10, or may require that internal power source 100b be more frequently replaced.

Figure 10:
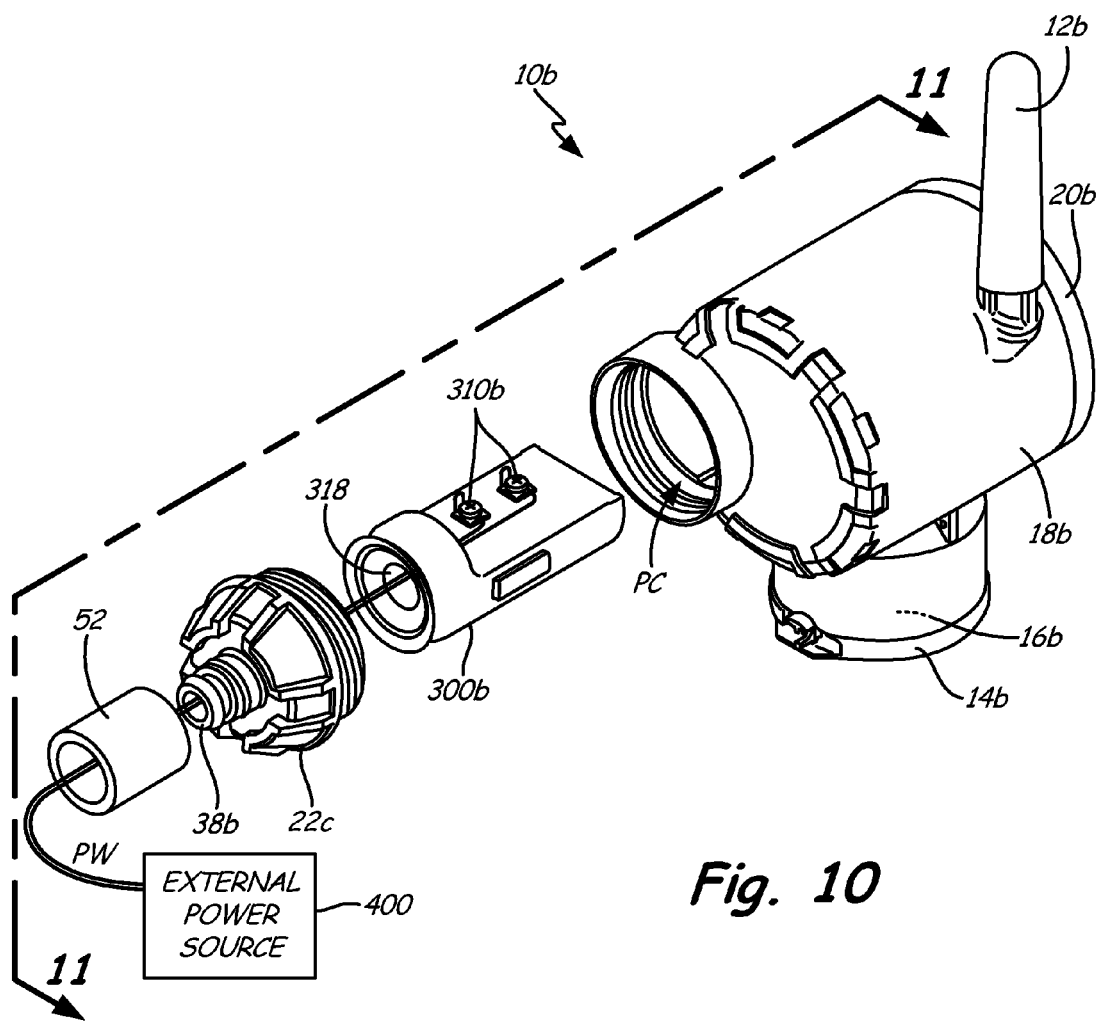
FIG. 10 is an exploded perspective view of the field device of FIG. 8, configured to operate on external power.

FIG. 10 is an exploded perspective view of field device 10b as configured to run on external power analogous to FIG. 5, above. FIG. 10 depicts antenna 12b, process connection 14b, transducer 16b, central housing 18b, electronics cover 20b, variant battery cover 22c, terminal module 300b, conduit 38b, conduit adapter 52, screw terminals 310b, wiring passage 318, external power source 400, power wiring PW, and power compartment PC. Antenna 12b, process connection 14b, transducer 16b, central housing 18b, and electronics cover 20b are as described above with respect to FIG. 9, and are analogous to corresponding features of field device 10 (described above with respect to FIGS. 2-7). Terminal module 300b replaces internal power source 100b within power compartment PC, and is accordingly sized similarly to a conventional C or D cell battery. Terminal module 300b includes screw terminals 310b analogous to screw terminals 310 of terminal module 300 of field device 10. Screw terminals 310b provide anchor and provide electrical contacts for power wiring PW. Power wiring PW runs from screw terminals 310b through wiring passage 318, conduit 38b, and conduit adapter 52 to external power source 400. External power source 400 may accept any appropriate local power source as described above with respect to FIGS. 5-7, such as a local power grid 12 or 24 V DC power supply, a solar panel, or an energy harvesting system such as a vibrational or thermoelectric scavenger.

In this embodiment, variant battery cover 22c is largely identical to battery cover 22b (see FIGS. 8 and 9), but includes conduit 38b, a sealed passage between power compartment PC and the surrounding environment. Terminal module 300b includes wiring passage 318, an aperture aligned with conduit 38b to allow power wiring PW to exit power compartment PC. Wiring passage 318 and conduit 38b together provide a path for power wiring PW extending between screw terminals 310b and external power source 400. Conduit adapter 52 is a cable guide for power wiring PW which snaps onto variant battery cover 22c, and is free to rotate relative to variant battery cover 22c, allowing conduit adapter 52 to be tightened onto external conduit pipe without tightening or loosening variant battery cover 22c.

As noted above field device 10b does not house a separate terminal block 26 within power compartment PC. Terminal module 300b interfaces with the same battery contacts used by internal power source 100 (see FIG. 11, below). Terminal module 300b allows field device 10b to be powered by sources other than internal power source 100. If terminal module 300b is configured to accept C cell batteries, for instance, terminal module 300b might allow field device 10 to accept power from solar panels or energy harvesting systems, as described above, or from an external battery pack for increased battery longevity over a single C cell battery.

Figure 11:
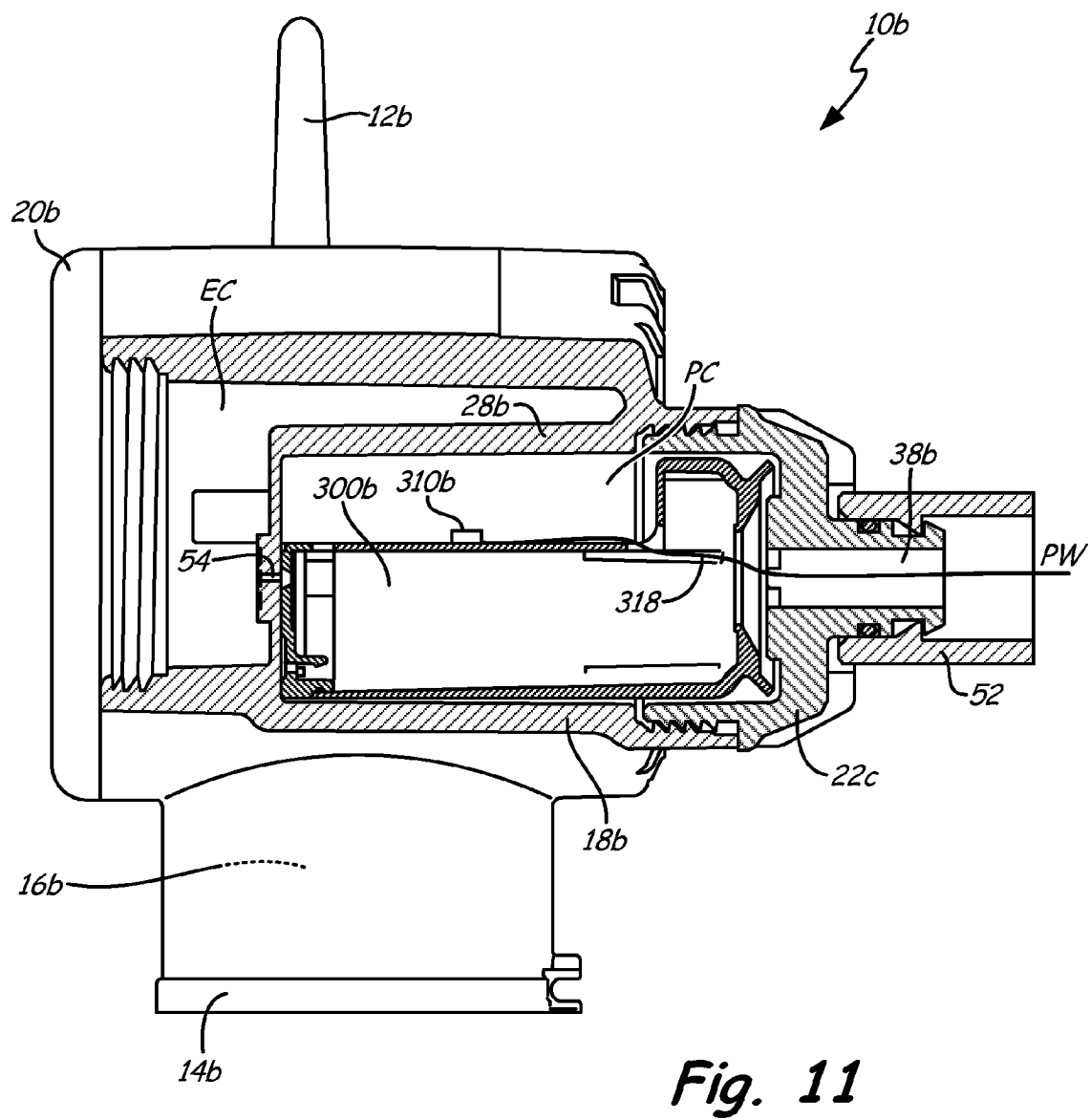
FIG. 11 is a cross-sectional view of the field device of FIG. 10.

FIG. 11 is a cross-sectional view of field device 10b through section plane 11-11 of FIG. 10. FIG. 11 depicts antenna 12b, process connection 14b, transducer 16b, central housing 18b, electronics cover 20b, variant battery cover 22c, internal wall 28b, power terminal 54, terminal module 300b, conduit 38b, conduit adapter 52, screw terminals 310b, wiring passage 318, power wiring PW, and power compartment PC.

Internal wall 28b is an impermeable wall analogous to internal wall 28 of field device 10, and separates power compartment PC from electronics compartment EC. As discussed above with respect to FIGS. 9 and 10, power compartment PC is sized to house internal power supply 100b or terminal module 300b, which are substantially identically sized. Power supply 100b may, for instance, be a conventional C or D cell battery, and power compartment PC correspondingly sized to fit this conventional battery. Electronics compartment EC houses signal transmission, reception, and processing electronics (not shown) substantially as described with respect to FIGS. 4 and 7

As described above, terminal module 300b replaces internal power source 100b, and screw terminal 310b for power wiring PW, which passes through wiring passage 318, conduit 38b of battery cover 22c, and conduit adapter 52. Terminal module 300b further includes power conditioning electronics such as rectifiers and current or overvoltage protection suitable to match external power to the output of internal power source 100. Terminal module 300b is received at power terminal 54, a conductive post which extends through internal wall 28b to carry power from terminal module 300b or internal power source 100b to electronics within electronics compartment EC. Terminal module 300b is selected to provide appropriate power conditioning for external power source 400, thereby allowing field device 10b to operate identically without regard to whether incoming power is provided by an internal source such as internal power supply 100b, or an external source via terminal module 300b.

The present invention introduces terminal modules 300 and 300b as replacements for internal power sources 100 and 100b. Terminal modules 300 and 300b receive and condition power from external power source 400 for reception by terminal block 26 or power terminal 54. In this way, terminal modules 300 and 300b allow field devices 12 and 12b to be quickly and easily configured to accept either internal or external power, as desired, without the need for a large multiplicity of distinct terminal blocks. A facility utilizing the terminal assembly of the present invention for N field device models with distinct hookups for terminal block 26, and M sources of external power with distinct power conditioning requirements, requires at most N+M distinct pieces; N terminal blocks and M terminal modules. For some applications, a single terminal module may service multiple external power sources, reducing the number of required parts to less than N+M. A conventional system using specialized terminal blocks for each field device/power source combination would instead use N×M distinct terminal blocks. In addition, the present invention compactly integrates power conditioning hardware into terminal modules 300 and 300b, thereby protecting these components within power compartment PC. Terminal modules 300 and 300b are sized and proportioned to fit snugly inside power compartment PC in place of internal power sources 100 or 100b.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wireless process field device assembly comprising:
   a process sensor which senses a process parameter;
   a processor configured to produce a process signal representing the sensed process parameter;
   a wireless transceiver configured to transmit the process signal;
   a housing which surrounds and protects the processor, and which has a housing receptacle configured to receive an internal power source;
   a terminal block located inside the housing and configured to route DC power from the internal power source to the processor and the wireless transceiver; and
   a terminal module with power conditioning electronics, the terminal module configured to fit into the housing receptacle and interface with the terminal block in the place of the internal power source, and to provide conditioned power to the terminal block from a wired connection to an external power source.

2. The wireless process field device assembly of claim 1, wherein the terminal block is a removable module which detachably fastens into the housing.

3. The wireless process field device assembly of claim 1, wherein the power conditioning electronics comprise a DC rectifier.

4. The wireless process field device assembly of claim 1, wherein the power conditioning electronics limit voltage and/or current transmitted to the terminal block.

5. The wireless process field device assembly of claim 1, wherein the wired connection to the external power source comprises at least one screw terminal.

6. The wireless process field device assembly of claim 1, wherein the housing includes at least one wire conduit through which the wired connection can pass into the receptacle.

7. The wireless process field device assembly of claim 1, wherein the housing comprises a sealed portion and a detachable cover which enclose the receptacle.

8. The wireless process field device assembly of claim 7, wherein the sealed portion fully encloses the processor, and further comprising a power supply control which distributes power from the terminal block to the processor and the wireless transceiver.

9. The wireless process field device assembly of claim 7, wherein the detachable cover has a wave spring, and the terminal module further comprises a support configured to interface with the wave spring when the detachable cover is attached to the sealed casing so as to retain the terminal module against excessive vibration.

10. The wireless process field device assembly of claim 1, wherein the terminal module has a connector insert with an O-ring that forms a friction fit with the terminal block.

11. A removable terminal module for a process field device, the removable terminal module comprising:
    a field device connection configured to mate with either an internal power source terminal configured to receive electrical power from an internal power source, or a wired power source connection configured to receive power from an external power source; and power conditioning electronics configured to condition power from the wired power source connection for transmission through the field device connection;

wherein the removable terminal module is configured to fit inside an interior portion of the process field device sized and proportioned to contain and support the internal power source.

12. The terminal module of claim 11, wherein the internal power source terminal is configured to secure and receive electrical power from a conventional C or D cell battery.

13. The terminal module of claim 11, wherein power conditioning electronics comprise an AC/DC rectifier.

14. The terminal module of claim 11, wherein the power conditioning electronics limit voltage and/or current transmitted through the field device connection.

15. The terminal module of claim 11, wherein the wired power source connection comprises at least one terminal screw on a connection board.

16. The terminal module of claim 11, wherein the field device connection comprises a detachable terminal block secured within the interior portion of the process field device.

17. A wireless process field device comprising:
a transducer connection which transmits and/or receives transducer signals to and/or from a transducer;
a wireless transceiver which transmits and/or receives process messages to and/or from a remote device;
a processor which processes transducer signals and process messages;
a housing which encloses and protects the processor;
a cover which defines a receptacle together with the housing, the receptacle configured to receive an internal power source;
a removable terminal module with power conditioning electronics, the removable terminal module configured to fit into the receptacle and in place of the internal power source, and further configured to condition and transmit electrical power from a wired external source to the processor and the wireless transceiver.

18. The wireless process field device of claim 17, wherein the transducer connection is a sensor connection which receives sensor signals from a process sensor which senses a process parameter.

19. The wireless process field device of claim 17, wherein the transducer connection is an actuator connection which transmits and/or receives actuator signals to and/or from an actuator.

20. The wireless process field device of claim 17, wherein the removable terminal module is configured to condition and transmit electrical power to the processor via a terminal block designed to mate with a battery or a capacitor.

21. The wireless process field device of claim 17, wherein the power conditioning electronics comprise an AC/DC rectifier.

22. The wireless process field device of claim 17, wherein the power conditioning electronics limit voltage and/or current transmitted through the field device connection.

23. The wireless process field device of claim 17, further comprising a sealed wire conduit into the receptacle through either the housing or the cover.

24. The wireless process field device of claim 17, wherein the cover includes a wave spring configured to support the internal power source and/or the terminal module.

25. A method comprising:
determining an internal power source;
designing a process field device with a process electronics and a housing receptacle sized and shaped to detachably enclose the internal power source, such that the internal power source is electrically connected to power the process electronics;
designing a power conditioning terminal module with shape and size selected to fit within the receptacle and be electrically connected to power the process electronics; and
providing a user with the process field device and at least one of the internal power source and the power conditioning terminal module.

* * * * *